Oct. 27, 1942.  E. ERNST ET AL  2,299,970
REFLEX TYPE WATER GAUGES
Filed March 12, 1941
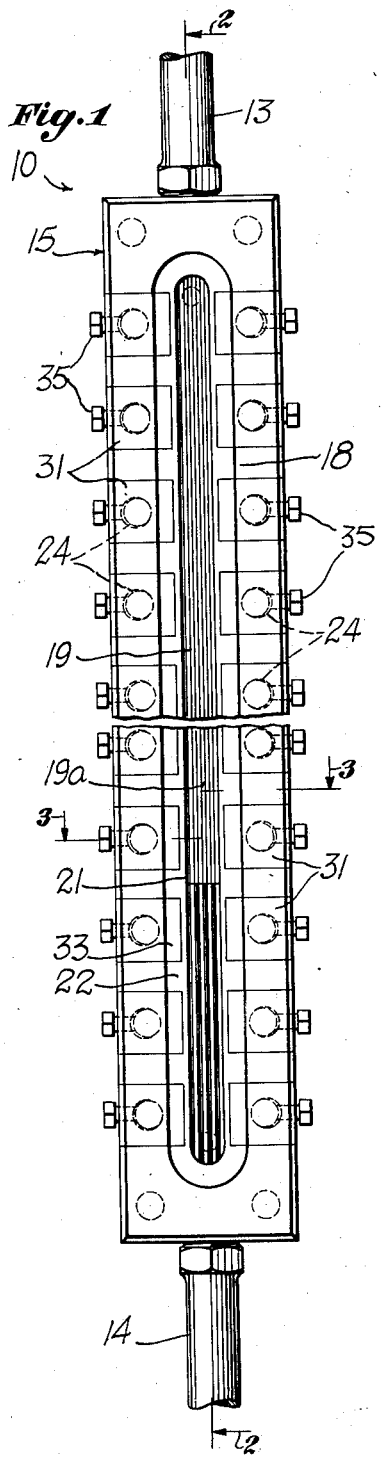
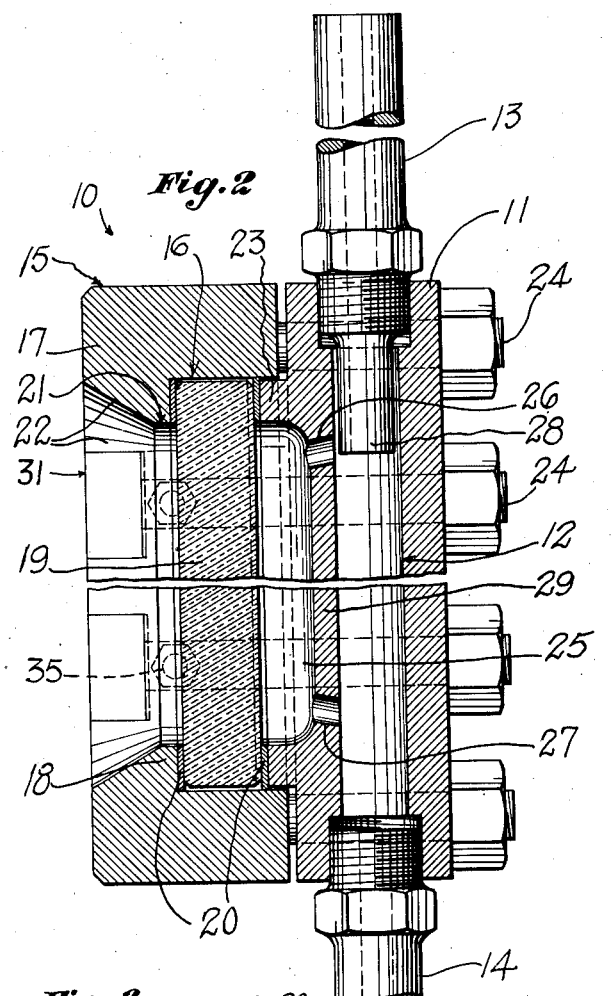
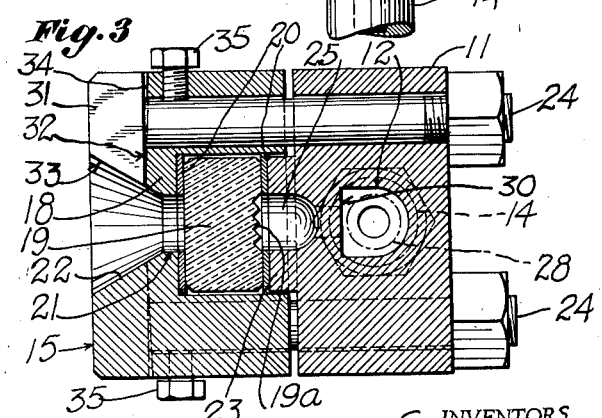
INVENTORS
Eugene Ernst and
Goswin Ernst
BY
Luis Shumacher
ATTORNEY.

Patented Oct. 27, 1942

2,299,970

UNITED STATES PATENT OFFICE 2,299,970

REFLEX TYPE WATER GAUGE

Eugene Ernst and Goswin Ernst, Livingston, N. J.

Application March 12, 1941, Serial No. 382,879

6 Claims. (Cl. 73—330)

This invention relates to liquid level gauges, and especially to such devices for use with high pressure boilers.

One object of the invention is to provide improved means to prevent condensate from entering the gauge chamber and thus scouring and clouding the glass.

Another object of the invention is to provide improved means for blowing down the gauge without exposing the glass to the pounding effect of the steam, which scours the glass.

Heretofore it has been sought to accomplish these objects by the use of a by-pass. While this was of assistance, the scouring and clouding still occurred. In fact, the glass was even covered with mica in gauges that used the by-pass. Apparently, the condensate or wet steam dripped or flowed through the openings connecting the gauge chamber with the by-pass, and so eventually got at the glass. And apparently the glass and mica were still subjected to the pounding effect, though in lesser degree.

We have devised a structure which affords a substantial improvement, and in fact, with our invention highly satisfactory results can be obtained without the use of mica, which is expensive, and diminishes visibility, and renders the use of reflex-view gauges impossible, as will be apparent hereinafter.

More specifically, our objects are as follows:

1. To provide a structure which shall practically avoid any flow of condensate into the gauge chamber, as by carrying the condensate substantially past the above-water opening to the gauge chamber.

2. To provide a structure which shall permit blowing down without a pounding effect on the glass, and solely by a secondary, circulatory flow of liquid in the gauge chamber.

3. To furnish a structure which shall cause such a secondary flow by reason of a very high suction produced in blowing down, with the suction automatically increasing if the gauge chamber happens to be quite dirty.

4. To furnish a structure in which the by-pass communicates with the gauge chamber by large non-clogging openings.

5. To provide a structure in which the above-water opening is baffled to reduce velocity (without diminishing its area) so that the secondary flow through the gauge chamber shall be sufficiently reduced to avoid the pounding effect in blowing down.

6. To afford a structure in which the condensate guide tube in the by-pass forms such a baffle.

7. To provide such a gauge in which the condensate tube is convexed toward the above-water opening to cause the greatest velocity reduction at the center of said opening.

Another object of the invention is to provide improved means such that the face plate shall not be sprung and hence become convexed by the powerful stress of the gauge bolts, with consequent leakage in the gauge.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a fragmentary view in front elevation showing a device embodying the invention.

Fig. 2 is a vertical sectional view taken on the line 2—2 of Fig. 1.

Fig. 3 is a sectional view taken on the line 3—3 of Fig. 2.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Referring in detail to the drawing, 10 denotes a gauge embodying the invention. The same include a main body 11 having a by-pass passage 12 extending from the top to the bottom thereof, into which are connected the respective upper and lower tubes 13, 14 which communicate with the water column of a high pressure steam boiler.

A secondary or gauge glass body 15 may be recessed at one side as at 16 to provide a front wall 17 and top and bottom walls and side walls 18, adapted to receive a heavy glass plate 19 and the sheet packings 20 at the opposite faces thereof. Formed in the front wall 17 is a slot opening 21 which may be beveled off as at 22 to increase the visibility of the liquid level. The packings 20 may have like windows to register with the window 21. At its rear or inner face the glass 19 may have longitudinal vertical grooves 19a for a so-called reflex view of the liquid level.

The secondary body member may be fitted to the main body 11, as by a continuous raised boss or flange 23 which is snugly received by the former. When the body members 11 and 15 are powerfully drawn toward each other, as by bolts 24, the packings 20, are compressed as shown, and the glass 20 is in sealed engagement with both members. In this manner, there is also sealed the gauge chamber 25 which may be formed by a recess provided in the body member 11 and defined by the lip or flange 23.

Communicating the by-pass with the chamber 25 are two openings, the one above the water level being at 26, and the other below the water level being at 27. The opening 26 preferably slopes downwardly toward the gauge chamber, and the opening 27 preferably slopes upward to the gauge chamber 25.

Extending downward into the by-pass 12 is a guide tube 28 which may be spaced from the wall 29 in which the openings 26, 27 are formed. Preferably the tube 28 is an extension of the removable connection 13. It may terminate at a point alongside of the opening 26, preferably at or slightly below the center of the opening 26. Due to its axial alinement with the by-pass, the tube 28 serves as a centering or guide means for the condensate and for carrying the latter and the blow-off steam past the opening 26.

In operation, condensate cannot enter the gauge chamber 25 but is centrally discharged by the tube 28 into the by-pass. Because the tube 28 is spaced from the wall 29, the condensate cannot creep along this wall to enter the opening 26. It is to be understood that the condensate or wet steam referred to is generated or results mainly in the fitting which connect the gauge to the boiler water column.

In blowing-down, a powerful jet of steam is passed through the connection 13, 14 and the by-pass 12, avoiding the gauge chamber 25 by reason of the flow centralizing tube 28. A powerful suction is created by the jet on the adjacent opening 26 and causes a circulation of steam or liquid or both through the by-pass and gauge chamber and the openings 26, 27 are sufficiently large to be non-clogging. Hence the swirl might be sufficiently powerful to scour the glass. But the lower end portion of the tube 28 forms a baffle to obstruct the flow and reduce its velocity. This velocity reduction is aided by the slope of the opening 26 which directs the flow upward against the tube, while the opening 27 slopes downward and inward of the by-pass to tend to oppose the flow. If the gauge chamber or the openings were sufficiently dirty to materially increase resistance to flow, the suction at the opening 26 would automatically greatly increase; and as soon as cleaning has occurred and the flow velocity restored, the effect of the suction would be diminished as hereinbefore explained. Some adjustment of the suction is possible by adjustment of the threaded connection 13 to thus raise or lower the tube 28.

By forming a plane surface 30 for the by-pass at least at the region of the opening 26, the tube forms a convex baffle which is closest to the opening 26 at the center thereof to reduce the flow at the point of maximum velocity and to assure sufficient clearance at the sides to prevent any clogging of the opening 26. Thus the tube 28 may be lowered somewhat further relative to the opening 26 for greater baffling if desired.

It will thus be seen that an efficient reliable device has been provided which prevents scouring and clouding of the glass, especially in view of the ridges 19a for reflex view of the water level.

Since the principal function of the bolts 24 is to exert the pressure on the glass, the bolts have been brought in closer to the glass, and in fact, the heads 31 thereof at least in part overlap the glass. To avoid obstruction of the sight opening 21, these heads 31 have been modified, first by being set into recesses 32 formed in the front wall 17, and, second, by being beveled off at 33 as shown to aline with the taper at 22. To assure maximum pressure of the bolts on the glass 19, the inner faces or seats of the bolt recesses are sloped outward to a minute degree as shown in exaggerated view at 34. Hence, if the bolt heads distort slightly due to heat and tension causing fatigue of the metal, the maximum pressure will not be shifted to the outer edge portions of the front wall 17, causing the same to yield out of plane, with resulting leakage. To prevent the bolts 24 from shifting in their holes due to clearance, set screws 35 are threaded through the sides of the body member 15 to abut the individual bolts 24 to thus prevent their heads from shifting and to keep their heads as closely as possible inward over the gauge glass.

It will thus be seen that a reflex view water level gauge has been provided, which is thus much simpler than the through-view type, and which can be made in much greater lengths than heretofore, being guarded against clouding of the glass and distortion of the front plate.

We claim:

1. A liquid level gauge including a glass plate element, and means for mounting the same providing a gauge chamber and a by-pass therefor separated from the gauge chamber by a wall extending lengthwise of the glass element, said wall having upper and lower openings intercommunicating the gauge chamber and the by-pass, and means for connecting the by-pass to a boiler, including a condensate centralizing tube projecting downward into the by-pass and terminating above the region of normal liquid level, to thus prevent condensate from flowing into the gauge chamber through said upper opening, said by-pass being substantially wholly straight throughout, and the lower end portion of said tube constituting a nozzle terminating in proximity to the center of said upper opening.

2. A liquid level gauge including a glass plate, and means for mounting the same providing a gauge chamber for the glass plate and a by-pass for the gauge chamber, the latter and the by-pass being separated by a wall having openings above and below the region of approximate normal liquid level and serving to connect the gauge chamber and the by-pass, means for operatively connecting the by-pass to a boiler, including a condensate centralizing blow-down tube projecting downward into the by-pass alongside of the upper opening and forming a baffle in the by-pass adjacent to the upper opening to reduce circulatory velocity through the gauge chamber in blowing down the gauge through the by-pass, thus permitting the use of only two large non-clogging openings in said wall for circulatory blowing down of the gauge chamber, said tube being mounted for vertical adjustment relative to the upper opening.

3. A liquid level gauge including a plate glass element, and means for mounting the same providing a gauge chamber for the element and a by-pass passage for said chamber, there being a wall separating said passage and chamber, said wall having openings near the top and bottom of said chamber, a condensate centralizing tube in said passage extending down to a point within the area of the top opening, and said top opening being inclined upward toward said passage to direct the aspirated fluid against the side of the tube.

4. A liquid level gauge having an elongated plate glass element, members for clamping said element therebetween and one of the members providing a gauge chamber on one side of the element, the other member having a slot forming a beveled sight window for the element, and bolts for clamping the members together located so closely adjacent to the glass element that the integral heads thereof overlap the element, the windowed member having recesses extending transversely of the glass element to receive the bolt heads, and the latter being beveled at the bevel of the window, whereby the view of the glass element is unobstructed and distortion of the windowed member by the stress of the bolts is avoided with the total width of the gauge being substantially reduced.

5. A liquid level gauge having a plate glass element, members for clamping said element therebetween and one of the members providing a gauge chamber on one side of the element, the other member having a slot forming a beveled sight window for the element, and bolts for clamping the members together located so closely adjacent to the glass element that the heads thereof overlap the element, the windowed member having transverse recesses to receive the bolt heads, and the latter being beveled at the bevel of the window, and settable means urging the bolts to move in the bolt openings toward the glass element.

6. A liquid level gauge having a plate glass element, members for clamping said element therebetween and one of the members providing a gauge chamber on one side of the element, the other member having a slot forming a beveled sight window for the element, and bolts for clamping the members together located so closely adjacent to the glass element that the heads thereof overlap the element, the windowed member having recesses to receive the bolt heads, and the latter being beveled at the bevel of the window, the seating engagement between the bolt heads and the inner surfaces of the recesses being along different planes such that the bolt heads exert maximum stress on that part of the windowed member which overlaps the glass element, with the provision of a clearance under those portions of the bolt heads which are remote from the glass element.

EUGENE ERNST.
GOSWIN ERNST.